(12) United States Patent
Kitano

(10) Patent No.: US 8,894,241 B2
(45) Date of Patent: Nov. 25, 2014

(54) LIGHT SOURCE DEVICE AND IMAGE DISPLAY DEVICE

(71) Applicant: Hiroshi Kitano, Hyogo (JP)

(72) Inventor: Hiroshi Kitano, Hyogo (JP)

(73) Assignee: Panasonic Corporation, Osaka (JP)

( * ) Notice: Subject to any disclaimer, the term of this patent is extended or adjusted under 35 U.S.C. 154(b) by 300 days.

(21) Appl. No.: 13/645,474

(22) Filed: Oct. 4, 2012

(65) Prior Publication Data
US 2013/0088471 A1   Apr. 11, 2013

(30) Foreign Application Priority Data

Oct. 6, 2011  (JP) ................................. 2011-221609
Aug. 24, 2012  (JP) ................................. 2012-185652

(51) Int. Cl.
*F21V 13/02* (2006.01)
*G09G 5/00* (2006.01)
*G03B 21/20* (2006.01)
*H04N 9/31* (2006.01)
*G03B 33/12* (2006.01)

(52) U.S. Cl.
CPC .......... *G03B 21/2013* (2013.01); *H04N 9/3114* (2013.01); *H04N 9/3161* (2013.01); *G03B 21/204* (2013.01); *G03B 21/2073* (2013.01); *G03B 21/208* (2013.01); *G03B 33/12* (2013.01)
USPC ............................. 362/257; 362/84; 345/208

(58) Field of Classification Search
USPC ............. 362/84, 257, 259, 260, 277; 345/208
See application file for complete search history.

(56) References Cited

U.S. PATENT DOCUMENTS

| | | | |
|---|---|---|---|
| 2010/0328627 A1 | 12/2010 | Miyazaki | |
| 2011/0128507 A1* | 6/2011 | Suzuki et al. | 353/31 |
| 2012/0268503 A1* | 10/2012 | Sugiyama et al. | 362/84 |

FOREIGN PATENT DOCUMENTS

| | | |
|---|---|---|
| JP | 2010-181529 A | 8/2010 |
| JP | 2011-013320 A | 1/2011 |

* cited by examiner

*Primary Examiner* — David V Bruce
(74) *Attorney, Agent, or Firm* — Shinjyu Global IP

(57) ABSTRACT

The light source device includes a first light source component, a fluorescent component, a first illuminance homogenizer, and a relay optical system. The first light source component emits laser light. The fluorescent component has a phosphor. The phosphor is excited by laser light. The first illuminance homogenizer converts the laser light into laser light showing a spatially uniform light intensity distribution. The first illuminance homogenizer is disposed between the first light source component and the fluorescent component. The relay optical system guides laser light emitted from the first illuminance homogenizer to the fluorescent component. The relay optical system is disposed between the first illuminance homogenizer and the fluorescent component.

18 Claims, 10 Drawing Sheets

LIGHT SOURCE DEVICE AND IMAGE DISPLAY DEVICE

CROSS-REFERENCE TO RELATED APPLICATIONS

This application claims priority under 35 U.S.C. §119 to Japanese Patent Application No. 2011-221609, filed on Oct. 6, 2011 and No. 2012-185652, filed on Aug. 24, 2012. The entire disclosure of Japanese Patent Application No. 2011-221609 and No. 2012-185652 are hereby incorporated herein by reference.

BACKGROUND

1. Technical Field

The technology disclosed herein relates to a light source device featuring a laser and a phosphor, and more particularly relates to a light source device that emits visible light such as red, green, blue, or other that is used in an image display device.

2. Background Information

Projectors are widely used as image display devices for projecting and enlarging various kinds of video or the like onto a screen. With a projector, light emitted from a light source is condensed or focused by a spatial light modulation element (a DMD (digital micromirror device) or a liquid crystal display element). The condensed or focused light is emitted after being modulated by an image signal at the spatial light modulation element. This emitted light is displayed on a screen as a color image.

With conventional projectors, high-pressure mercury lamps of high brightness have been used as the light source in order to obtain a bright, large-screen image. However, when a high-pressure mercury lamp is used as the light source, there is an environmental drawback in that the lamp contains mercury, which is a hazardous substance. Another problem with high-pressure mercury lamps is that they have a short lifetime as a light source, and they are difficult to maintain.

To solve these problems, there have been proposals for light source devices that make use of solid-state light source such as a light emitting diode (LED), laser, or other instead of a high-pressure mercury lamp, as well as for image display devices in which these light source devices are used.

A laser light source has a longer lifetime than a high-pressure mercury lamp. Also, a laser light source produces coherent light, so the light has good directionality and is utilized more efficiently. Furthermore, thanks to its monochromaticity, a laser light source can reproduce colors over a wide range.

Nevertheless, because of its high interference, a problem with laser light is that speckle noise is produced, which adversely affects image quality. Furthermore, when laser light is emitted at high output, physical safety must be ensured to avoid accidental irradiation of the human eye by the high-output laser beam.

Also, an LED light source is less prone to the above-mentioned problems of speckle noise and safety issues. However, with an LED light source, the emission surface area of the light source is large, and the optical energy density of a green LED is particularly low. Accordingly, with an LED light source, at present it is difficult to obtain a high-brightness image display device using LED's of three colors (red, green, and blue).

Meanwhile, light source devices and illumination devices have been proposed that make use of an LED light source or laser light source as an excitation source, and light emitted from a phosphor as a solid-state light source. Image display devices equipped with the above-mentioned devices have also been proposed.

With a light source device involving a phosphor, a high-brightness light source with a small emission surface area can be obtained by using a laser or the like capable of high-density convergence as the excitation light source. Also, even when a laser is used as the excitation light source, the fluorescent light obtained by frequency conversion is incoherent light. Accordingly, with this type of light source device, no speckle noise is generated and no convergence of laser light occurs, so such devices are favorable in terms of physical safety.

To obtain a highly efficient light source device that can be applied to an image display device, it is preferable for the emission surface area of the light source component to be as small as possible. However, if the spot diameter of the laser beam condensed or focused on the phosphor is made too small, this will result in a problem in that the temperature of the phosphor increases and the emission efficiency of the fluorescent light decreases. This is called temperature quenching, and is a serious technological problem when using a phosphor.

With an illumination device for an image display device, it is generally necessary to use illumination light having a rectangular spatial intensity distribution that matches the shape of the DMD or liquid crystal display-equivalent element. Therefore, illuminance homogenizer such as a rod integrator or other having a rectangular cross section is sometimes used. In this case, to obtain an efficient light source device in which a phosphor is used as the light source, it is effective for the shape of the emission face of the phosphor to be substantially equivalent to the shape of the rod integrator.

In Japanese Laid-Open Patent Application 2011-13320 (Patent Literature 1), a blue semiconductor laser is used as the excitation light source, and a reflective configuration is used in which the phosphor is disposed on a rotating reflective substrate to take off light to the rear. In Japanese Laid-Open Patent Application 2010-181529 (Patent Literature 2), a discharge lamp that generates ultraviolet light is used as the excitation light source. In Patent Literature 2, a transmissive configuration is used in which the phosphor is disposed on a rotating transparent substrate to take off light to the front.

In Patent Literature 1, a blue semiconductor laser is used as the excitation light source, and a reflective configuration is used in which the phosphor is disposed on a rotating reflective substrate to take off light to the rear. In Patent Literature 1, the obtained fluorescent light is used as green illumination light for an image display device, but since the spatial distribution of the laser beam spot on the phosphor is not strictly controlled, problems are that (1) the spatial intensity distribution shape of the fluorescent light on the phosphor does not match the incident end face shape of the rod integrator, so optical loss occurs, and (2) the laser beam spot on the phosphor is too small, so the effect of temperature quenching is considerable.

In Patent Literature 2, a discharge lamp that generates ultraviolet light is used as the excitation light source, and a transmissive configuration is used in which the phosphor is disposed on a rotating transparent substrate to take off light to the front. In Patent Literature 2, a rod integrator is inserted between the excitation light source and the phosphor, and the spatial intensity distribution of the excitation light directed at the phosphor is matched to the same rectangular shape as the DMD, but since a gap is required between the rod integrator and a phosphor module having a rotary mechanism, the excitation light spot on the phosphor ends up spreading out considerably, so it is difficult to obtain a highly efficient illumination device.

The present technology is proposed in light of the above situation, and provides a light source device that uses a phosphor to obtain illumination light of high brightness and high efficiency.

SUMMARY

The light source device disclosed herein comprises a first light source component, a fluorescent component, a first illuminance homogenizer, and a relay optical system. The first light source component is configured to emit laser light. The fluorescent component includes a phosphor. The phosphor is excited by laser light. The first illuminance homogenizer is configured to convert laser light into laser light which shows a spatially uniform light intensity distribution. The first illuminance homogenizer is disposed between the first light source component and the fluorescent component. The relay optical system is configured to guide laser light emitted from the first illuminance homogenizer to the fluorescent component. The relay optical system is disposed between the first illuminance homogenizer and the fluorescent component.

With the present technology, since a laser is used as the excitation light source for exciting a phosphor, light with good directionality and high density can be obtained. Also, an illumination spot that is smaller than that with prior art can be focused on the phosphor. Further, the output of excitation light can be easily increased by using a plurality of laser light sources.

Also, with the present technology, since the first illuminance homogenizer and the relay optical system are disposed between the laser light source and the phosphor substrate, the phosphor can be irradiated with a laser light beam having the proper spatial intensity distribution and the proper spot diameter.

The "first illuminance homogenizer" here is an optical system for equalizing the spatial intensity distribution of a laser light beam. A "relay optical system" is an optical system for focusing on the phosphor a uniform laser light flux obtained from the first illuminance homogenizer.

With the present technology, a bright, highly efficient light source device can be obtained by using a solid-state light source that does not harm the environment and has a long lifetime. An image display device of high image quality in which this light source device is used can also be provided.

BRIEF DESCRIPTION OF THE DRAWINGS

Referring now to the attached drawings, which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Embodiments of a light source device and an image display device will now be described through reference to the drawings.

First Embodiment

Figure 1:
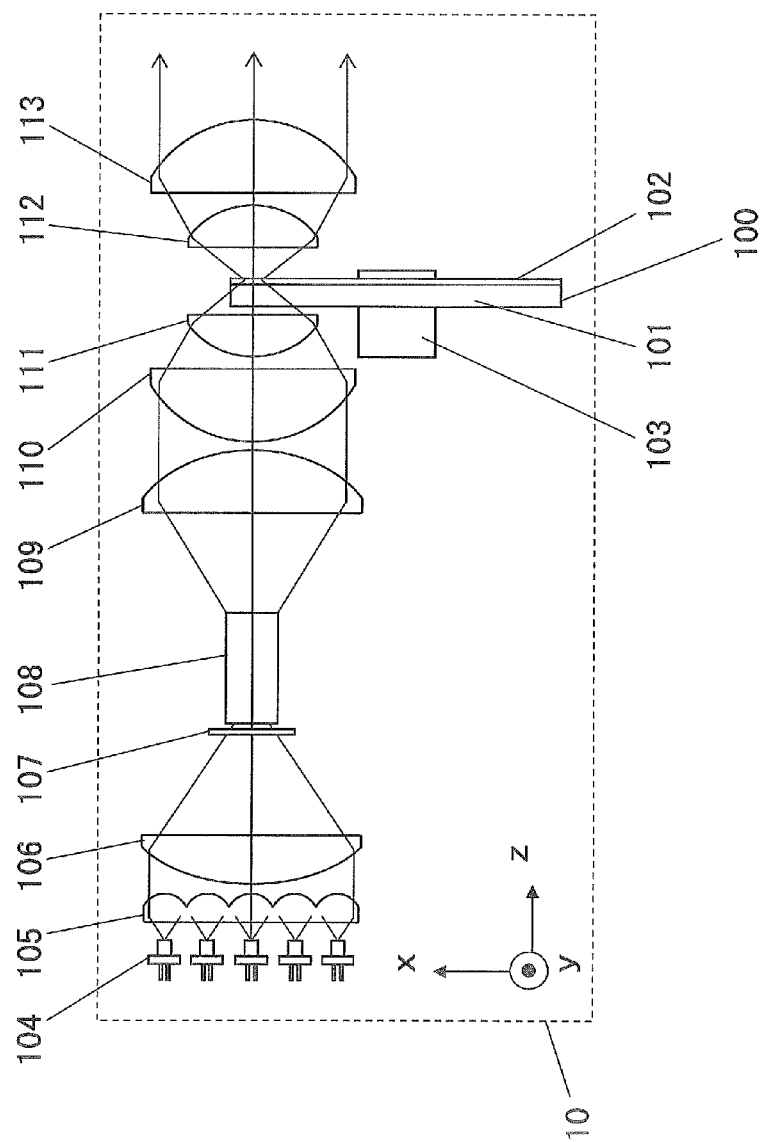
FIG. 1 is a diagram of the configuration of the light source device pertaining to a first embodiment.

FIG. 1 is a diagram of the configuration of the light source device 10 pertaining to a first embodiment. The output light from the light source device 10 is made up of fluorescent light. The output light of the light source device 10 can be used as illumination light for an image display device or the like.

A laser light source 104 (an example of a first light source component) is a blue semiconductor laser that oscillates at a wavelength of approximately 445 nm. The laser light source 104 is made up of a plurality of semiconductor lasers to obtain a light source device of high brightness. In this embodiment, a total of 25 semiconductor layers are arranged in a 5×5 matrix. However, the number of semiconductor lasers is not limited to what is used in this embodiment, and may be suitably set according to the optical intensity of the semiconductor lasers, the intensity of the output light to be taken off from the light source device, and so on.

Nor is the wavelength of the laser light limited to blue near 445 nm, and a violet semiconductor laser that oscillates near 405 nm, an ultraviolet semiconductor laser of 400 nm or less, or the like may be used.

The laser light emitted from the laser light source 104 is collimated by a collimator lens array 105. A single laser diode is disposed for each lens cell of the collimator lens array 105. Specifically, the collimator lens array 105 is made up of 25 lens cells. In this embodiment, a lens array is used as a collimator lens, but independent collimator lenses may be used for each of the laser diodes instead.

The laser light flux emitted from the collimator lens array 105 is made up of a total of 25 beams. These 25 laser beams are pointed substantially parallel. That is, the 25 laser beams form a substantially parallel light flux. This entire light flux is condensed or focused by a focusing lens or a condensing lens 106, passes through a diffuser plate 107, and is coupled to a rod integrator 108 (an example of a first illuminance homogenizer). The collimator lens array 105 and the focusing lens or the condensing lens 106 are adjusted so as to couple the 25 laser beams to the rod integrator 108 without any loss.

The diffuser plate 107 is a glass plate. A diffuser face that has been finely textured is formed on one side of the diffuser plate 107. There are no particular restrictions on the diffusion characteristics here, but in this embodiment a diffuser plate with a diffusion angle of three degrees (full width at half maximum) is used.

The rod integrator 108 is a rectangular solid piece of dense quartz glass whose incident end face and emission end face are rectangular and measure 8.0×6.0 mm and which is 60 mm in length. There are no particular restrictions on the rod integrator, which may be larger or smaller than the above-mentioned rod integrator. Also, the rod integrator may be made of some kind of optical glass other than quartz glass, or may be a hollow rod (mirror rod) in which a square side face is formed with a reflecting mirror. The rod integrator may also be a tapered rod in which the incident end face and emission end face are different sizes.

The spatial intensity distribution of the laser light flux at the incident face of the rod integrator is given by superposing the spatial intensity distributions of the 25 laser beams. The laser spot position formed by the 25 laser beams at the incident face of the rod integrator is offset by the effect of mechanical tolerance and optical aberration. Therefore, the spatial intensity distribution of the entire laser light flux at the rod integrator incident face tends to be uneven, and variance tends to occur in the overall laser light flux diameter as well.

However, as a result of full reflection in the interior of the rod integrator, the laser light flux emitted from the rod integrator has a uniform spatial intensity distribution at the rod integrator emission end face, and the light flux diameter can also be uniquely given in the size of the rod integrator emission end face.

The laser light flux emitted from the rod integrator 108 is converted by a collimator lens 109 back into a substantially parallel light flux. This laser light flux is condensed or focused by focusing lenses or condensing lenses 110 and 111 and directed onto the phosphor. Specifically, the relay optical system for the laser light flux is made up of three lenses, 109, 110, and 111. The image of the emission end face of the rod integrator 108 is formed on the phosphor by this relay optical system. The lateral magnification of the relay optical system here is 0.25, and the spot of the laser light flux formed on the phosphor measures 2.0×1.5 mm.

The rod integrator is disposed in an optical system through which propagates laser light that excites a phosphor, and the emission light from the rod integrator is reduced in size and focused on the phosphor, which allows a laser light flux having the proper spot diameter and a uniform spatial intensity distribution to be reliably directed at the phosphor.

In this embodiment the relay optical system is made up of three lenses, but may instead be made up of one or two lenses, or made up of four or more lenses. Also, although there are no particular restrictions on the lateral magnification of the system, 1 or less is preferable.

A phosphor wheel 100 (an example of a fluorescent component) is made up of a substrate 101, a phosphor 102 applied by coating the substrate 101, and a motor 103 for rotating the substrate 101 coated with the phosphor 102.

The substrate 101 is a disk-shaped piece of parallel-plate glass capable of transmitting laser light. The two sides of the glass are given different coatings. An anti-reflective coating (against laser light) is applied to the surface on the side where the laser light flux is incident. The surface where the laser light flux is emitted is given a dichroic coating (an example of a reflector, and an example of a first color separator) that is highly transmissive to laser light and highly reflective to fluorescent light. The phosphor 102 is formed as a thin film over this dichroic coating.

As shown in FIG. 1, when a xyz perpendicular coordinate system is defined, the face of the substrate 101 where the phosphor 102 is provided is formed in a disk shape that is parallel to the xy plane. The substrate 101 can be rotated by the motor 103, with the rotational axis being parallel to the z axis.

Figure 2:
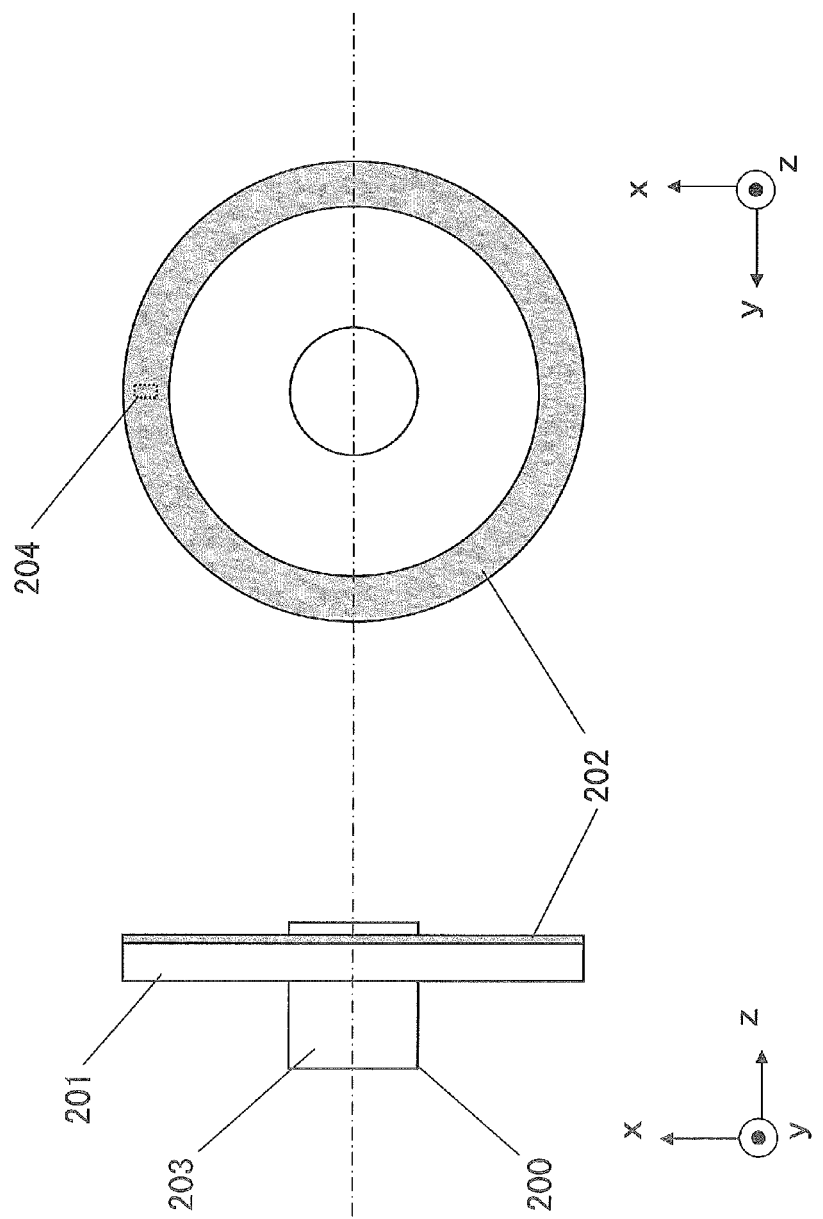
FIG. 2 is a diagram of the configuration of the phosphor wheel used with the light source device pertaining to the first embodiment.

FIG. 2 shows a specific configuration of the phosphor wheel 100 as seen in the z axis direction. The diameter of a substrate 201 is 60 mm. The outermost peripheral portion of the substrate 201 is coated with a phosphor 202 in a ring shape with a width of 4 mm. The shape of a laser light irradiation spot 204 on the phosphor 202 is indicated by the broken line. The laser light is incident from the rear (z direction) as the drawing is viewed, passes through the substrate 201, and then irradiates the phosphor 202. The system is adjusted so that even when the substrate is rotated by a motor 203, the laser light flux will always irradiate the phosphor 202.

There are no particular restrictions on the diameter of the substrate, but it is preferably at least 10 times the length in the short axis direction (y direction) of the laser light spot 204 formed on the phosphor 202. Nor are there any particular restrictions on the coating width of the phosphor 202, but the coating width of the phosphor 202 is preferably at least equal to and no more than two times length in the long axis direction (x axis direction) in FIG. 2 of the laser light spot 204 formed on the phosphor 202. In this embodiment, the coating width of the phosphor 202 is 4 mm, which is two times the 2 mm length of the laser light spot in the x axis direction. There are no particular restrictions on the rotating speed of the motor, either, but at least 1000 rpm is preferable in order to suppress the effect of decreasing efficiency resulting from heat generation by the phosphor 202.

The phosphor 202 emits fluorescent light whose dominant wavelength band is from green to yellow. This phosphor 202 is preferably a phosphor that efficiently generates fluorescent light by efficiently absorbing blue excitation light, and that is highly resistant to temperature quenching. In this embodiment, $Y_3Al_5O_{12}:Ce^{3+}$, which is a phosphor with a cerium-doped garnet structure, is used as the phosphor 202. The dominant wavelength of fluorescent light is approximately 560 nm.

There are no particular restrictions on the material of the phosphor 202, such as a green phosphor. For example, besides a phosphor with a cerium-doped garnet structure, examples include $(Ba,Sr)_2SiO_4:Eu^{2+}$, $SrSi_2O_2N_2:Eu^{2+}$, $Ba_3Si_6O_{12}N_2:Eu^{2+}$, $Sr_3Al_3Si_{13}N_{23}:Eu^{2+}$, and $\beta$-SiAlON:$Eu^{2+}$ as phosphors with which green fluorescent light can be obtained with a blue laser having a wavelength of 445 nm.

There are no particular restrictions on the method for producing the phosphor layer, but examples include printing and molding. Also, the suitable thickness of the phosphor layer will vary with the type of phosphor coating and the coating method, so while there are no particular restrictions, the average thickness is preferably at least equal to the average particle size of the phosphor powder.

The fluorescent light produced by the phosphor 202 (102) is released substantially equally in all directions. When a powdered phosphor 202 is disposed as a thin film on the substrate, the fluorescent light will be affected by scattering, and will have a light distribution close to a Lambertian distribution, which has a peak in the normal direction of the face where the phosphor layer is disposed.

Of the fluorescent light released from the phosphor layer, the fluorescent light facing the glass substrate 101 is reflected by the dichroic coating applied over the glass substrate 101. More specifically, the fluorescent light released rearward from the phosphor layer (into a space on the side where the laser light is incident, using the phosphor layer as a reference) is reflected by the dichroic coating applied over the glass substrate 101. Therefore, with this configuration, the fluorescent light ends up being taken off only forward from the phosphor layer. Specifically, this light source device 10 is a transmissive type of light source device. The direction indicated by the above-mentioned "rearward" is to the left side in FIG. 1, using the phosphor layer as a reference. Also, the direction indicated by the above-mentioned "forward" is to the right side in FIG. 1, using the phosphor layer as a reference.

The fluorescent light flux taken off forward from the phosphor wheel 100 is collimated by the collimating lenses 112 and 113, after which it becomes the output light of the light source device 10.

If there is no rod integrator 108 in an optical system in which laser light is used to excite fluorescent light (if the length of the rod integrator 108 is zero in the optical system in FIG. 1), then an offset will occur in the density of laser light irradiating the phosphor, as mentioned above. If the laser light density is too high, the phosphor temperature will rise, resulting in a decrease in the frequency conversion efficiency of the phosphor due to the effect of temperature quenching. That is, employing the configuration of this embodiment makes it possible to properly irradiate the phosphor with a laser light flux having a small spot diameter and equalized brightness. Specifically, a light source device with which fluorescent light of high brightness is taken off at high efficiency can be provided.

Second Embodiment

Figure 3:
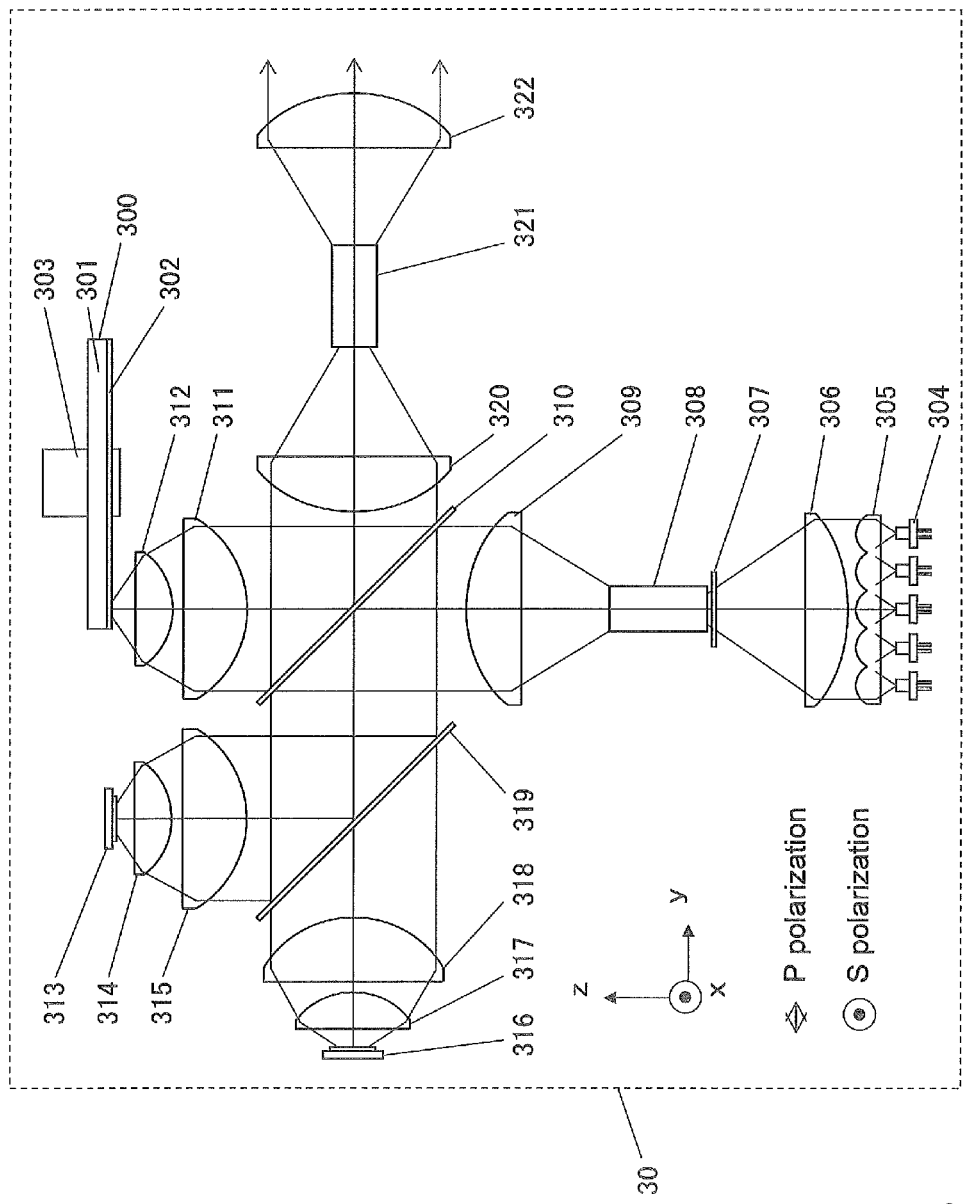
FIG. 3 is a diagram of the configuration of the light source device pertaining to a second embodiment.

FIG. 3 is a diagram of the configuration of the light source device 30 pertaining to a second embodiment. The output light of the light source device 30 is made up of three colors of visible light: red, green, and blue. The output light of the light source device 30 can be used as illumination light for an image display device or the like. Some of the constituent elements in this embodiment are the same as the constituent elements in first embodiment, and redundant descriptions will be eliminated in the following.

A laser light source 304 (an example of a first light source component), a collimator lens array 305, a focusing lens or a condensing lens 306, and a diffuser plate 307 are the same as in the first embodiment. Here again, the laser light flux that has passed through the diffuser plate 307 is incident on a first rod integrator 308 (an example of a first illuminance homogenizer).

The first rod integrator 308 is similar to the rod integrator 108 in the first embodiment in that it is a rectangular solid piece of dense quartz glass whose incident end face and emission end face measure 8.0×6.0 mm and is 60 mm in length.

The emission end face shape of the first rod integrator 308 is substantially equivalent to the incident end face shape of a second rod integrator 321. More specifically, the following relation is satisfied:

$$S1 \times (\beta 1^2) \times (\beta 2^2) \leq S2$$

In this relation, S1 is the emission end face area of the first rod integrator 308. $\beta 1$ is the lateral magnification of laser light from the emission end face of the first rod integrator 308 to a phosphor wheel 300. S2 is the incident end face area of the second rod integrator 321. $\beta 2$ is the lateral magnification of fluorescent light from the phosphor wheel 300 to the incident end face of the second rod integrator 321.

The laser light flux emitted from the first rod integrator 308 is collimated by a collimator lens 309, after which it is incident on a dichroic mirror 310 (an example of a first color separator).

The dichroic mirror 310 is disposed tilted at approximately 45 degrees with respect to the optical axis of the laser light flux. The dichroic mirror 310 is highly transmissive in the blue wavelength band, is highly reflective in the green wavelength band, and is highly transmissive in the red wavelength band.

The polarization direction of the emitted light of all of the blue semiconductor lasers is adjusted so as to achieve the linear polarization state of P polarization shown in FIG. 3. Since the laser light flux passes through the dichroic mirror 310, higher transmissivity can be obtained with the dichroic mirror when the layout affords P polarization.

The laser light flux that has passed through the dichroic mirror 310 is condensed or focused by focusing lenses or condensing lenses 311 and 312 and is incident on the phosphor. Here, the relay optical system is made up of three lenses (309, 311, and 312). 309 is a first lens group. 311 and 312 are a second group of lenses. The dichroic mirror 310 is disposed between the first lens group 309 and the second lens groups 311 and 312.

The lateral magnification of the relay optical system here is 0.25. The spot of the laser light flux formed on the phosphor measures 2×1.5 mm.

The phosphor wheel 300 (an example of a fluorescent component) is made up of a substrate 301, a phosphor 302 applied by coating the substrate 301, and a motor 303. The motor 303 rotates the phosphor and the substrate around a rotational axis that is parallel to the z axis.

The substrate 301 is a disk-shaped aluminum substrate. The surface of this aluminum substrate serves as a reflecting mirror for visible light. A coating that efficiently reflects the entire band of visible light is applied to the surface on one side of this aluminum substrate (an example of a reflector). Furthermore, the phosphor 302 that emits fluorescent light is formed as a thin film over this coating.

When temperature quenching of the phosphor is taken into account, the substrate is preferably made of a material with high thermal conductivity. Therefore, in this embodiment aluminum was chosen as the material for the substrate 301, but this is not the only option, and any other material with high thermal conductivity may be used instead.

Just as in the first embodiment, the diameter of the substrate 301 is 60 mm. The outermost peripheral portion of the substrate 301 is coated with the phosphor 302 in a ring shape with a width of 4 mm. The phosphor used here is $Y_3Al_5O_{12}$:$Ce^{3+}$, just as in the first embodiment.

The second embodiment differs from the first embodiment in that fluorescent light released forward (into a space on the opposite side from the side where the laser light is incident, as seen from the phosphor layer) is reflected by the aluminum substrate surface. Specifically, in the second embodiment, a reflective configuration is used in which fluorescent light is taken off only on the rearward side.

In frequency conversion in a phosphor, the fluorescent light intensity of the rearward component is generally greater than the fluorescent light intensity of the forward component. Therefore, the configuration of the second embodiment allows the fluorescent light to be taken off more efficiently than does the configuration of the first embodiment.

The laser light focusing lenses or the laser light condensing lenses 311 and 312 act as collimating lenses with respect to fluorescent light released from a green phosphor. The green fluorescent light flux collimated and taken off effectively by the focusing lenses or the condensing lenses 311 and 312 is reflected by the dichroic mirror 310.

A blue LED 313 serving as a second light source (an example of a second light source component) is a high-output LED whose dominant wavelength is approximately 455 nm. The emission face is rectangular and measures 4×3 mm. The blue LED light emitted from the blue LED is collimated by focusing lenses or condensing lenses 314 and 315, after which it is incident on a dichroic mirror 319.

A red LED 316 serving as a third light source (an example of a second light source component) is a high-output LED whose dominant wavelength is approximately 625 nm. The emission face is rectangular and measures 4×3 mm. The red LED light emitted from the red LED is collimated by focusing lenses or condensing lenses 317 and 318, after which it is incident on the dichroic mirror 319, just as with the blue LED light.

The dichroic mirror 319 is highly reflective in the blue wavelength band, and highly transmissive in the red wavelength band. Therefore, the light emitted from both LED's is spatially combined and incident on the dichroic mirror 310.

The dichroic mirror 310 acts as a color separator for laser light and fluorescent light. On the other hand, the dichroic mirror 310 functions as a color combiner for LED light, and allows LED light and fluorescent light to be combined. Specifically, the dichroic mirror 310 combines the function of a color separator with the function of a color combiner.

The light flux spatially combined by the dichroic mirror 310 (green fluorescent light, blue laser light, and red laser light) is condensed or focused by a focusing lens or a condensing lens 320. This light flux is then incident on the second rod integrator 321 serving as an illuminance homogenizer for fluorescent light (an example of a second illuminance homogenizer). The light emitted from the second rod integrator 321 is collimated by a collimating lens 322, and is taken off as output light from this light source device.

The second rod integrator 321 is a rectangular solid piece of dense quartz glass whose incident end face and emission end face measure 8.0×6.0 mm and is 60 mm in length.

The long axis directions of the first and second rod integrator cross sections, and the long axis directions of the emission face of the second and third light sources all match and lie in a plane parallel to the paper plane in FIG. 3.

For green fluorescent light, the three lenses 312, 311, and 320 constitute a relay optical system from over the phosphor to the second rod integrator incident end face. The lateral magnification thereof is 4.0. Therefore, the spot diameter of the fluorescent light flux formed on the second rod integrator incident end face is approximately 8×6 mm.

Meanwhile, for blue LED light, the three lenses 314, 315, and 320 constitute a relay optical system from the LED light emitting face to the second rod integrator incident end face. Similarly, for red LED light, the three lenses 317, 318, and 320 constitute a relay optical system from the LED light emitting face to the second rod integrator incident end face. The lateral magnification of the relay optical system is 2.0 for both colors. Accordingly, the spot diameter of the LED light flux formed on the second rod integrator incident end face is approximately 8×6 mm for both blue and red light.

Specifically, the flux shape of the green fluorescent light, blue LED light, and red LED light incident on the second rod integrator is adjusted to be substantially the same as the rod integrator incident end face shape. Therefore, each kind of light can be efficiently coupled to the rod integrator.

As discussed above, employing the configuration of this embodiment makes it possible to provide a light source device with which three colors of visible light, namely, red, green, and blue light, can be taken off at high efficiency.

Third Embodiment

Figure 4:
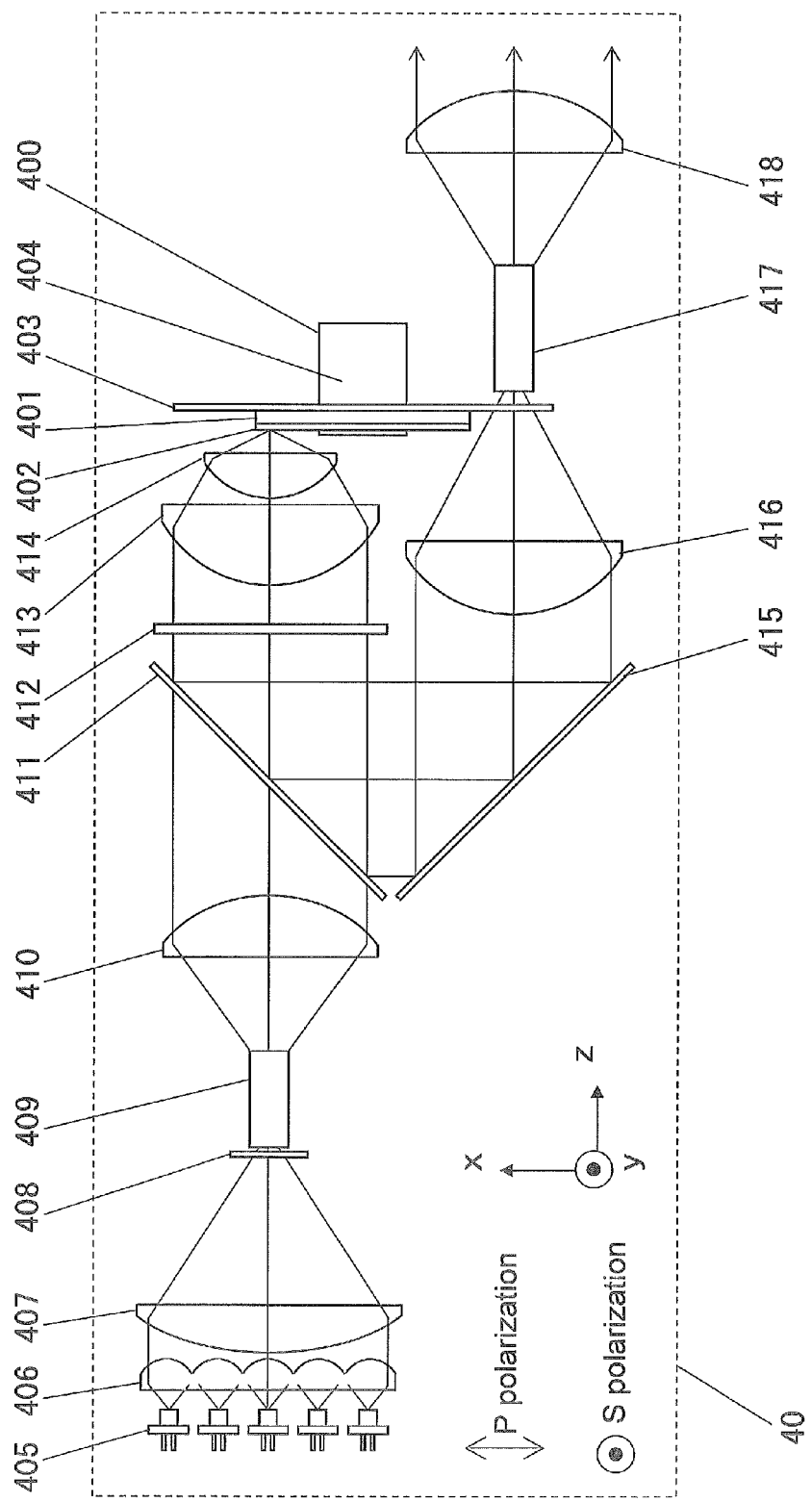
FIG. 4 is a diagram of the configuration of the light source device pertaining to a third embodiment.

FIG. 4 is a diagram of the configuration of the light source device 40 pertaining to a third embodiment. The output light of the light source device 40 is made up of visible light of three time segments of periodically switched red light, green light, and blue light. The output light of the light source device is used as illumination light for an image display device or the like.

The constituent elements from a laser light source 405 (an example of a first light source component) to a collimating lens 410 are the same as the constituent elements in the second embodiment, and therefore will not be described again.

A dichroic mirror 411 (an example of a first color separator) is disposed tilted at approximately 45 degrees with respect to the optical axis of the laser light flux. The dichroic mirror 411 is highly transmissive to P polarization and highly reflective to S polarization in the laser light wavelength band, and is highly reflective regardless of the polarization direction in the green to red wavelength band. Therefore, blue laser light adjusted to P polarization passes through the dichroic mirror 411.

Figure 5:
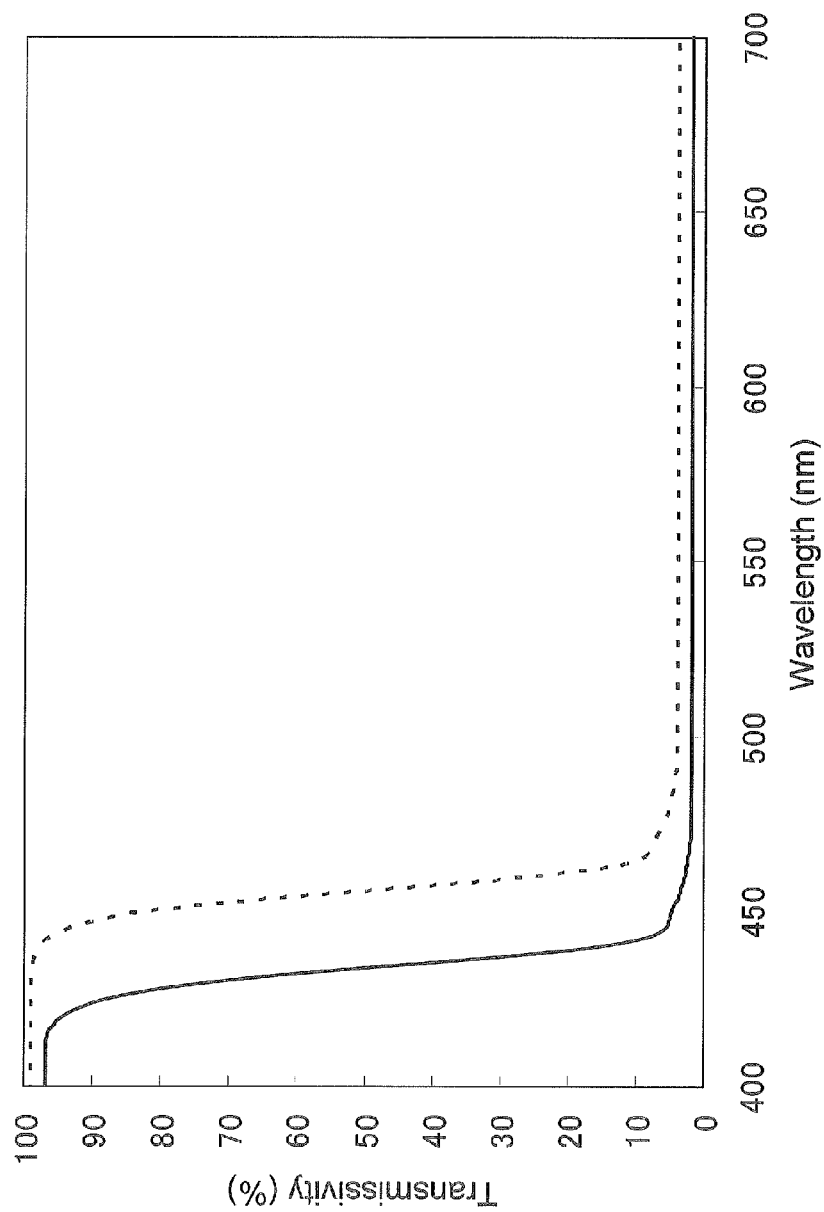
FIG. 5 shows the transmission spectrum at an incidence of 45 degrees on a dichroic mirror used in the light source device pertaining to the third embodiment.

FIG. 5 shows the transmission spectrum of the dichroic mirror 411 at an incidence angle of 45 degrees. Of the two plots, the solid line shows the transmissivity of S polarization, and the broken line shows the transmissivity of P polarization. The dichroic mirror 411 is highly transmissive (a transmissivity of at least 90%) in the violet wavelength band, and is highly reflective (a reflectivity of at least 90%) in the blue to red wavelength band. The cutoff wavelength at which the transmissivity reaches 50% is 434 nm for S polarization and 456 nm for P polarization. The cutoff wavelength is 22 nm longer with P polarization than with S polarization.

The laser light that has passed through the dichroic mirror 411 is converted into circularly polarized light by a quarter-wavelength plate 412, and is condensed or focused on a phosphor 402 by focusing lenses or condensing lenses 413 and 414.

The phosphor wheel 400 (an example of a fluorescent component) used in this embodiment is made up of an aluminum substrate 401, a phosphor 402, a dichroic filter 403 (an example of a second color separator), and a motor 404. The surface of the aluminum substrate 401 (an example of a reflector) is given a coating so as to be highly reflective to visible light. The phosphor 402 is applied by coating the surface of the substrate 401. The dichroic filter 403 is attached to the substrate 401.

Figure 6:
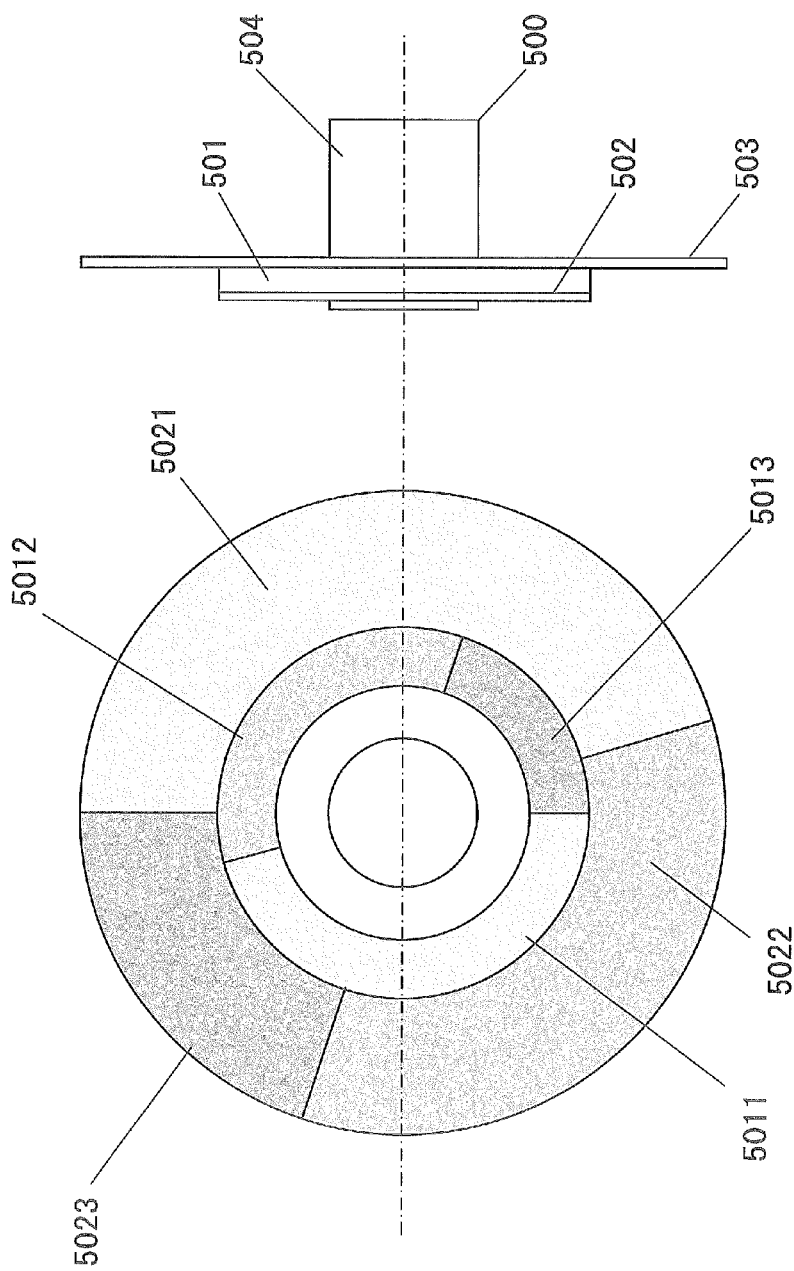
FIG. 6 is a diagram of the configuration of the phosphor wheel used with the light source device pertaining to a fourth embodiment.

FIG. 6 shows the specific configuration of the phosphor wheel 400. A phosphor 502 (402) is made up of three spatial segments. The three spatial segments are made up of a red phosphor layer 5011, a green phosphor layer 5012, and a phosphor uncoated face 5013. The red phosphor and the green phosphor are applied by coating a substrate 501, whose surface has been given a mirror finish. The phosphor uncoated face 5013 is a metal mirror face.

The material used for the green phosphor is the same as that in the first embodiment. In this embodiment, the red phosphor is $CaAlSiN_3:Eu^{2+}$. Examples of other phosphors that are excited by a blue laser with a wavelength of 445 nm and with which red fluorescent light can be obtained include $Sr_2Si_5N_8:Eu^{2+}$ and $SrAlSi_4N_7:Eu^{2+}$.

A dichroic filter 503 is disposed on the outer peripheral side of the phosphor 502 (402). The dichroic filter 503 is made up of three spatial segments. The three spatial segments are made up of a red selective filter 5021, a green selective filter 5022, and a blue selective filter 5023.

The red selective filter 5021 is highly reflective in the blue to green wavelength bands, and is highly transmissive in the red wavelength band. The green selective filter 5022 is highly reflective in the blue and red wavelength bands, and is highly transmissive in the green wavelength band. The blue selective filter 5023 is highly transmissive in the blue wavelength band. With the blue selective filter 5023, the glass surface on the emission side is not flat, and is instead a diffuser face that has been finely textured so that the light will be diffused. In this embodiment, a diffuser face with a diffusion angle of approximately three degrees (full width at half maximum) was used, but there are no particular restrictions on the diffusion characteristics.

When the phosphor wheel 400 rotates, the spot on the phosphor 502 (402) irradiated with laser light is periodically switched between the red phosphor layer, green phosphor layer, and phosphor uncoated layer. Correspondingly, the light reflected from the phosphor 502 (402) is periodically switched between red fluorescent light, green fluorescent light, and blue laser light.

The laser light focusing lenses or the laser light condensing lenses 413 and 414 act as collimating lenses with respect to the fluorescent light released from the red phosphor layer 5011 and the green phosphor layer 5012. The fluorescent light flux taken off and collimated by the focusing lenses or the condensing lenses 413 and 414 passes through the quarter-wavelength plate 412 and is then reflected by the dichroic mirror 411.

Meanwhile, if the excitation light irradiation spot on the phosphor 502 (402) is on the phosphor uncoated face 5013, the laser light is reflected as it is. This laser light is then collimated by the focusing lenses or the condensing lenses 413 and 414. After this, the laser light passes through the quarter-wavelength plate 412 and is thereby adjusted to S polarization. This laser light is incident on the dichroic mirror 411 and is reflected by the dichroic mirror 411.

The red fluorescent light, green fluorescent light, and blue laser light (unconverted excitation light) reflected by the dichroic mirror 411 are transmitted through the dichroic filter 403 via a reflecting mirror 415 and a focusing lens or a condensing lens 416. This light flux is then coupled to a second rod integrator 417 (an example of a second illuminance homogenizer).

In a time region such that the laser light spot on the phosphor 402 (502) is present on the red phosphor layer 5011, the layout of the segments of the phosphor wheel 400 (500) is adjusted so that the condensed or focused spot on the dichroic filter 403 (503) condensed or focused by the focusing lens or the condensing lens 416 is located in the interior of the red selective filter 5021 (this time region will herein after be referred to as the red segment). Specifically, the red phosphor layer 5011 and the red selective filter 5021, which are constituent elements of the red segment, are disposed at positions that are in 180-degree symmetry with each other, with equal division angles in the full-peripheral 360 degrees.

Similarly, in a time region in which the red selective filter 5021 is irradiated with laser light (hereinafter referred to as the green segment), light is transmitted through the green selective filter 5022. The layout of segments of the phosphor wheel 400 (500) is adjusted so that in a time region in which the phosphor uncoated face 5013 is irradiated with laser light (hereinafter referred to as the blue segment), light is transmitted through the blue selective filter 5023.

Using the dichroic filter 403 removes unnecessary residual laser light that was not converted to a fluorescent light wavelength in the red segment. In the green segment, unnecessary residual laser light is removed, and of the fluorescent light released from the green phosphor, the fluorescent light component with an unnecessarily long wavelength is removed. In the blue segment, there is no change in the spectral components, but speckle noise is reduced by transmission through a rotating diffusion element.

The three segments of light (red, green, and blue) emitted from the second rod integrator are collimated by a collimating lens 418 and taken off as output light from this light source device.

Again in this embodiment, a first rod integrator 409 (an example of a first illuminance homogenizer) and the second rod integrator 417 are each a rectangular solid piece of dense quartz glass whose incident end face and emission end face measure 8.0×6.0 mm and is 60 mm in length. The lateral magnification of the laser light is 0.25 with the relay optical systems 410, 413, and 414 from the emission end face of the first rod integrator 409 to the phosphor 402. The lateral magnification of the light in the three segments of the relay optical system from the phosphor 402 to the incident end face of the second rod integrator 417 is approximately four times for each.

The relation between the first rod integrator 308 and the second rod integrator 321 holds in this embodiment just as in the second embodiment.

Employing the configuration of this embodiment makes it possible to provide a light source device with which three colors of visible light, namely, red, green, and blue light, can be taken off efficiently and simply.

Fourth Embodiment

Figure 7:
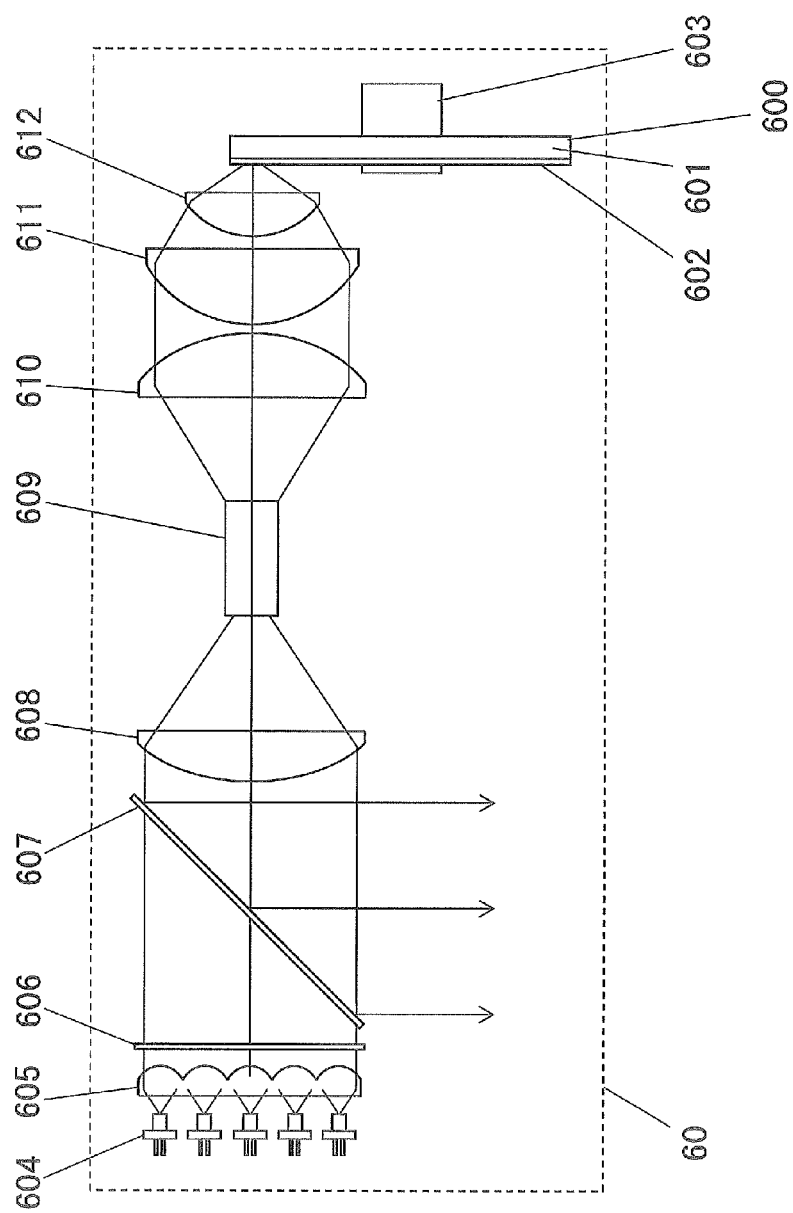
FIG. 7 is a diagram of the configuration of the light source device pertaining to the fourth embodiment.

FIG. 7 is a diagram of the configuration of the light source device 60 pertaining to a fourth embodiment. Just as in the third embodiment, the output light of the light source device is made up of periodically switched visible light of three time segments (red light, green light, and blue light). The output light of the light source device can be used as illumination light for an image display device or the like.

A laser light source 604 (an example of a first light source component) is a violet semiconductor laser that oscillates at a wavelength of approximately 405 nm, and just as in the other embodiments, a total of 25 semiconductor lasers are disposed. The laser light emitted from the laser light source 604 is collimated by a collimating lens 605. The laser light is transmitted through a diffuser plate 606 and a dichroic mirror 607 (an example of a third color separator), after which it is coupled to a rod integrator 609 (an example of a first illuminance homogenizer) by a focusing lens or a condensing lens 608.

The diffuser plate 606 is a flat glass sheet. A diffuser face with a diffusion angle of three degrees (full width at half maximum) is formed on one side of the diffuser plate 606. The dichroic mirror 607 (an example of a first color separator) is disposed tilted by approximately 45 degrees with respect to the optical axis of the laser light flux. The dichroic mirror 607 is highly transmissive in the violet wavelength band, and is highly reflective in the blue, green, and red wavelength bands.

The rod integrator 609 is a rectangular solid piece of dense quartz glass whose incident end face and emission end face are rectangular and measure 8.0×6.0 mm and which is 60 mm in length. The laser light flux emitted from the rod integrator is converted on a phosphor 602 via focusing lenses or condensing lenses 611 and 612. Here, a relay optical system is constituted by the collimating lens 610 and the focusing lenses or the condensing lenses 611 and 612.

A phosphor wheel 600 (an example of a fluorescent component) is made up of a substrate 601, a phosphor 602, and a motor 603. The surface of the substrate 601 serves as a reflecting mirror for visible light. The substrate 601 is coated with the phosphor 602. The motor 603 rotates the phosphor 602 and the substrate 601, with the rotational axis being parallel to the z axis.

Figure 8:
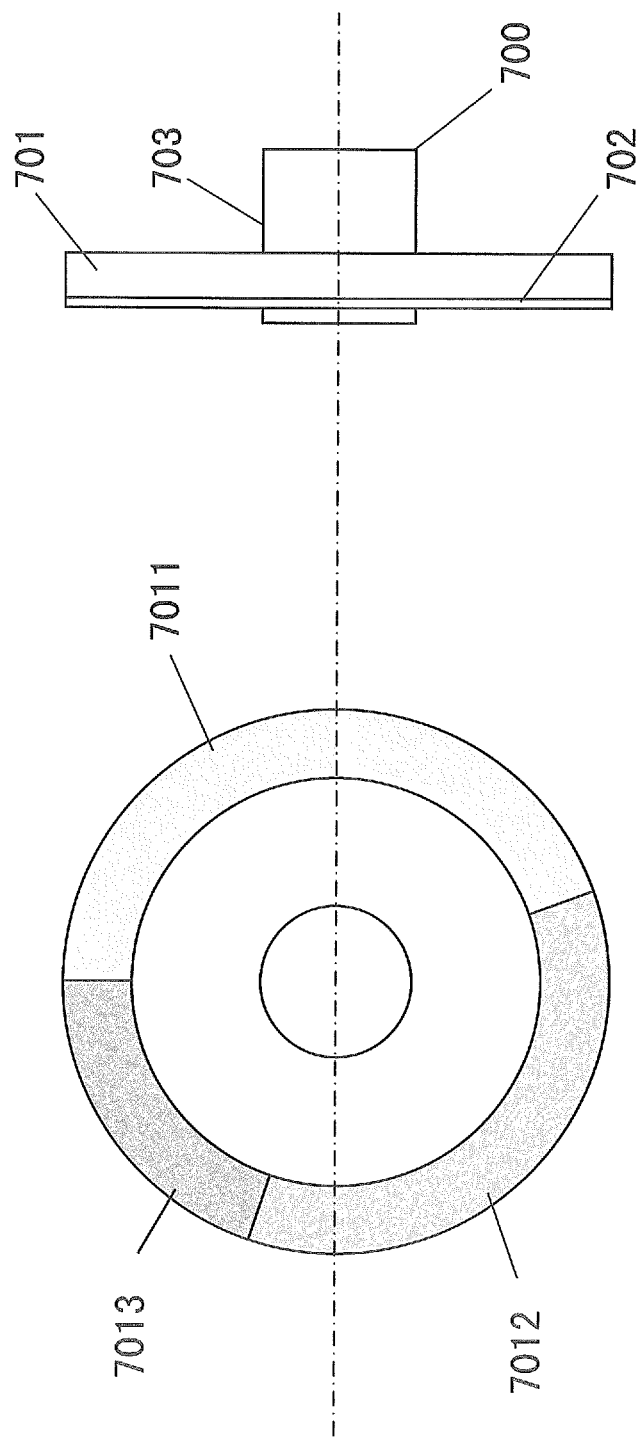
FIG. 8 is a diagram of the configuration of the phosphor wheel used with the light source device pertaining to the fourth embodiment.

FIG. 8 shows the specific configuration of the phosphor wheel 600. A phosphor 702 is made up of three spatial segments. The three spatial segments consist of a red phosphor layer 7011, a green phosphor layer 7012, and a blue phosphor layer 7013. The three spatial segments are divided into three segments in the peripheral direction (over a range of 360 degrees). When a phosphor wheel 700 is rotationally driven, the spot irradiated by laser light is periodically switched from the red phosphor layer, to the green phosphor layer, to the blue phosphor layer, and back to the red phosphor layer. This makes it possible to take off three colors of fluorescent light from the light source device.

The fluorescent light taken off rearward from the phosphor 602 passes back through the three lens 612, 611, and 610, and is coupled to the rod integrator 609. The three colors of fluorescent light emitted from the rod integrator 609 are collimated by a focusing lens or a condensing lens 608, after which it is reflected by the dichroic mirror 607, which is a color separation means. The light flux reflected by the dichroic mirror 607 becomes the output light from the light source device.

In this embodiment, the illuminance homogenizer for laser light and the illuminance homogenizer for fluorescent light are constituted by the same rod integrator 609. Accordingly, a more compact light source device can be provided in this embodiment.

Fifth Embodiment

Figure 9:
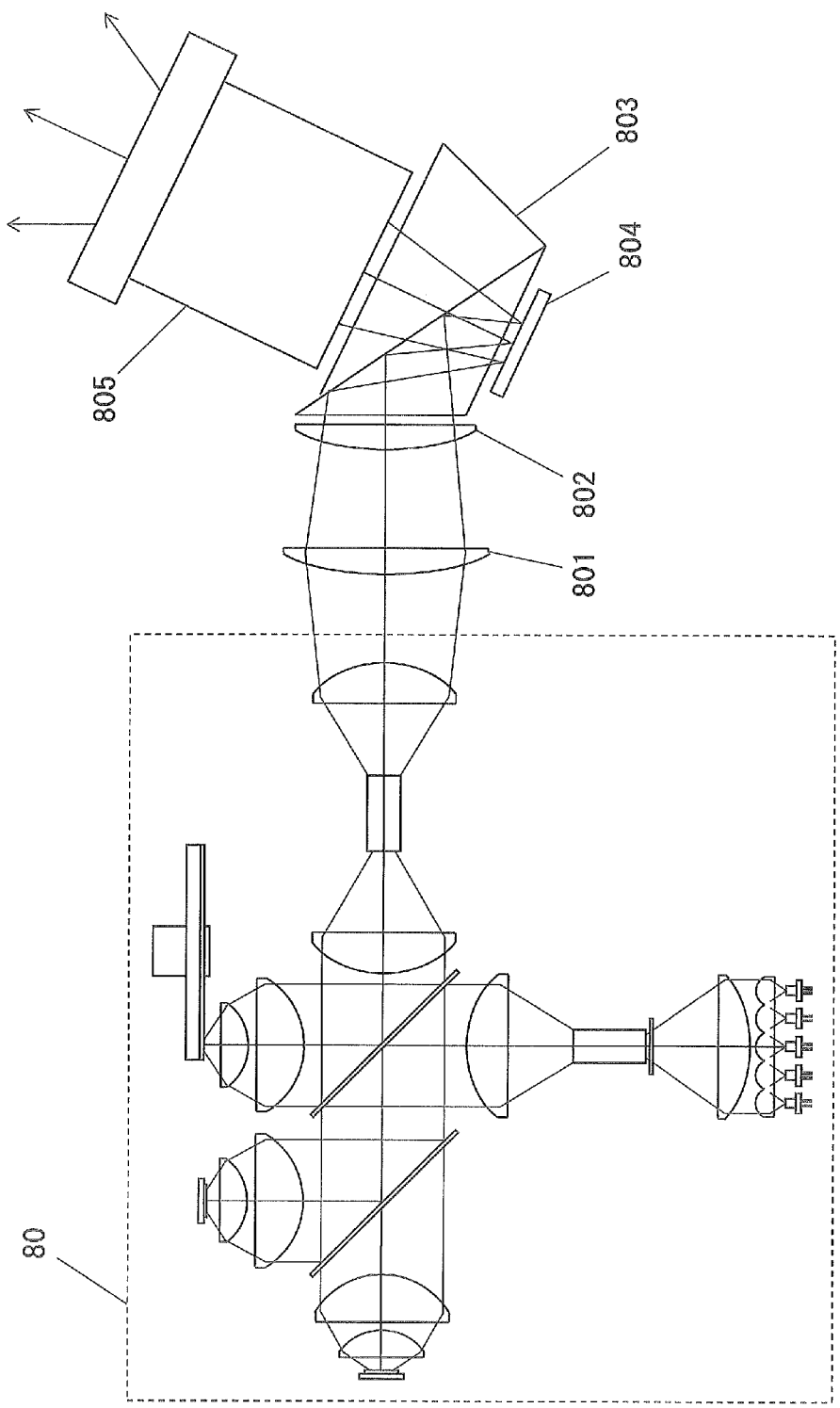
FIG. 9 is a diagram of the configuration of the light source device pertaining to a fifth embodiment.

FIG. 9 is a diagram of the configuration of the light source device pertaining to a fifth embodiment. This embodiment is an image display device that makes use of the light source device of the second embodiment.

A light source device 80 corresponds to the light source device 30 shown in FIG. 3 in the second embodiment. The illuminance of the output light of the light source device 80 is equalized at the emission face of the second rod integrator 321. This output light passes through a relay lens 801, a field lens 802, and a full reflection prism 803, and is incident on a DMD 804, which is an image display element. The optical systems 801, 802, and 803 are constituted so that the emission face shape of the second rod integrator 321 will be efficiently and uniformly condensed or focused on the DMD 804.

The DMD 804 has a plurality of microscopic mirrors 2 disposed two-dimensionally. These mirrors change their inclination according to red, green, and blue image input signals, which means that the mirrors form signal light that is temporally modulated. When the DMD 804 is driven by a red image signal, the drive timing of the DMD 804 and the light source device 80 is controlled so that red light will be outputted from the red LED 316 in the light source device 80. When the DMD 804 is driven by a green image signal, the DMD 804 and the light source device 80 are controlled so that the laser light source 304 is lit. When the DMD 804 is driven by a blue image signal, the DMD 804 and the light source device 80 are driven so that the blue LED 313 is lit. The signal light modulated by the DMD 804 is projected onto a screen (not shown) by a projecting lens 805.

The DMD 804 is an example of a spatial light modulation element. The optical systems 801 and 802 are examples of illumination optical systems. The projecting lens 805 is an example of a projected light optical system.

The configuration of the image display device given in this embodiment affords an image display device that is compact, highly efficient, and has a long lifetime.

In this embodiment, the image display device was configured to make use of the light source device given in the second embodiment, but a similar image display device may be configured by applying the light source device from another embodiment.

Conclusion (1) The light source devices 10, 30, 40, and 60 comprise the laser light sources 104, 304, 405, and 604, the phosphor wheels 100, 300, 400, and 600, the rod integrators 108, 308, 409, and 609, and the relay optical systems (109, 110, 111), (309, 311, 312), (410, 413, 414), and (610, 611, 612).

The laser light sources 104, 304, 405, and 604 emit laser light. The phosphor wheels 100, 300, 400, and 600 have the phosphors 102, 302, 402, and 602 that are excited by laser light. The rod integrators 108, 308, 409, and 609 convert laser light into laser light which shows a spatially uniform light intensity distribution.

The rod integrators 108, 308, 409, and 609 are disposed between the laser light sources 104, 304, 405, and 604 and the phosphor wheels 100, 300, 400, and 600.

The relay optical systems (109, 110, 111), (309, 311, 312), (410, 413, 414), and (610, 611, 612) guide the laser light emitted from the rod integrators 108, 308, 409, and 609 to the phosphor wheels 100, 300, 400, and 600. The relay optical systems (109, 110, 111), (309, 311, 312), (410, 413, 414), and (610, 611, 612) are disposed between the rod integrators 108, 308, 409, and 609 and the phosphor wheels 100, 300, 400, and 600.

With this technology, the laser light sources 104, 304, 405, and 604 are used as excitation light sources for exciting the phosphors 102, 302, 402, and 602. Accordingly, light can be obtained in a high density and high directionality. Also, a small irradiation spot can be formed on the phosphors 102, 302, 402, and 602. Furthermore, using the plurality of laser light sources 104, 304, 405, and 604 allows the output of excitation light to be easily increased.

The rod integrators 108, 308, 409, and 609 and the relay optical systems (109, 110, 111), (309, 311, 312), (410, 413, 414), and (610, 611, 612) are disposed between the laser light sources 104, 304, 405, and 604 and the rod integrators 108, 308, 409, and 609. Consequently, the phosphors 102, 302, 402, and 602 can be irradiated with a laser light flux having the proper spatial intensity distribution and spot diameter.

Here, the rod integrators 108, 308, 409, and 609 are optical systems for equalizing the spatial intensity distribution of a laser light flux. The relay optical systems (109, 110, 111), (309, 311, 312), (410, 413, 414), and (610, 611, 612) are optical systems for focusing the uniform laser light fluxes obtained by the rod integrators 108, 308, 409, and 609 on the phosphors 102, 302, 402, and 602.

(2) With the light source devices 10, 30, 40, and 60, the phosphor wheels 100, 300, 400, and 600 further have the reflecting substrates 101, 301, 401, and 601. The phosphors 102, 302, 402, and 602 are provided to the surface of the reflecting substrates 101, 301, 401, and 601. Fluorescent light is reflected by the reflecting substrates 101, 301, 401, and 601.

With this technology, fluorescent light emitted from the phosphors 102, 302, 402, and 602 can be reflected by the reflecting substrates 101, 301, 401, and 601, so the fluorescent light can be outputted efficiently in one direction.

(3) The light source devices 10, 30, 40, and 60 further comprise the dichroic coating 101 or the dichroic mirrors 310, 411, and 607. The dichroic coating 101 or the dichroic mirrors 310, 411, and 607 spatially separate laser light and fluorescent light.

If this technology is a transmissive configuration as shown in FIG. 1, the dichroic coating 101 guides a laser light flux to the phosphor and reflects the fluorescent light flux emitted from the phosphor. Consequently, the fluorescent light flux can be outputted efficiently. If this technology is a reflective configuration as shown in FIGS. 3, 4, and 7, a laser light flux incident on the phosphor and a fluorescent light flux emitted from the phosphor are moving through the same space in opposite directions, so the fluorescent light can be reliably separated spatially from the laser light by the dichroic mirrors 310, 411, and 607.

(4) The light source devices 10, 30, 40, and 60 comprise the rod integrators 108, 308, 409, and 609.

With this technology, a laser light flux and a fluorescent light flux having a spatially uniform light intensity distribution can be obtained with a simple configuration. More specifically, a rectangular, uniform spatial intensity distribution can be easily formed with respect to the laser light flux and fluorescent light flux.

(5) With the light source devices 10, 30, 40, and 60, the relay optical systems (109, 110, 111), (309, 311, 312), (410, 413, 414), and (610, 611, 612) are made up of at least two lens groups.

With this technology, a light flux spot can be formed very precisely on a phosphor by forming a relay optical system so that a laser light flux substantially becomes collimated light between adjacent lens groups.

(6) With the light source devices 30 and 40, the relay optical systems have the first lens groups 309 and 410 and the second lens groups (311, 312) and (413, 414). The dichroic mirrors 310 and 411 are disposed between the first lens groups 309 and 410 and the second lens groups (311, 312) and (413, 414).

With this technology, a relay optical system is configured so that a laser light flux substantially becomes collimated light between the first lens groups 309 and 410 and the second lens groups (311, 312) and (413, 414). Consequently, the incidence angle of a light flux incident on the dichroic mirrors 310 and 411 can be kept substantially constant. Specifically, loss of light caused by the dichroic mirrors 310 and 411 can be suppressed.

(7) With the light source devices 30 and 40, the dichroic mirrors 310 and 411 are disposed between the rod integrators 308 and 409 and the phosphor wheels 300 and 400.

With this technology, the light flux is equalized at the rod integrators 308 and 409, and fluorescent light and laser light can be reliably separated spatially by the dichroic mirrors 310 and 411.

(8) The light source devices 30 and 40 further comprise the rod integrators 321 and 417 (second rod integrator).

In general, when fluorescent light is used as illumination light for an image display device, a uniform spatial intensity distribution is required, so it is preferable to use a homogenization means for equalizing the spatial intensity distribution of the fluorescent light.

With this technology, fluorescent light can be converted into fluorescent light which shows a spatially uniform light intensity distribution and outputted by the rod integrators 321 and 417. More specifically, a fluorescent light flux having a spatially uniform light intensity distribution can be obtained with a simple configuration. Even more specifically, a fluorescent light flux having a rectangular and uniform spatial intensity distribution can be formed easily.

(9) With the light source devices 30 and 40, the emission end face shape of the rod integrators 308 and 409 are substantially similar to the incident end face shape of the rod integrators 321 and 417. More specifically, with the light source device 60, the following relation is satisfied.

$$S1 \times (\beta 1^2) \times (\beta 2^2) \leq S2$$

In this relation, S1 is the emission end face area of the first rod integrators 308 and 409. $\beta 1$ is the lateral magnification of laser light from the emission end face of the first rod integrators 308 and 409 to the phosphor wheel 600. S2 is the incident end face area of the rod integrators 321 and 417. $\beta 2$ is the lateral magnification of fluorescent light from the phosphor wheels 300 and 400 to the incident end face of the rod integrators 321 and 417.

With this technology, the spatial intensity distribution of the fluorescent light fluxes incident on the rod integrators 321 and 417 is the same as the shape of the incident end faces of the rod integrators 308 and 409. Also, the light flux diameter of the rod integrators 321 and 417 is equal to or less than the incident end face diameter of the rod integrators 308 and 409. This increases the efficiency of coupling to the rod integrator. If the above-mentioned relation does not hold true, then the fluorescent light flux diameter at the incident end faces of the rod integrators 321 and 417 will end up being too large. Therefore, there may be more loss in coupling to the rod integrator.

(10) With the light source device 60, laser light illuminance homogenization and fluorescent light illuminance homogenization are performed by the rod integrator 609.

With this technology, the spatial intensity distribution of the laser light flux and the spatial intensity distribution of the fluorescent light flux are equalized at the same time by the single rod integrator 609. This allows the light source device 60 to be more compact.

(11) The light source device 30 further comprises the blue LED 313 and the red LED 316. The blue LED 313 and the red LED 316 emit light of a different wavelength from that of the fluorescent light emitted from the phosphor 302. The shape of the light emitting components of the blue LED 313 and the red LED 316 is substantially similar to the emission end face shape of the first rod integrator 308.

With this technology, a different light source from the laser light sources 104, 304, 405, and 604 is used, such as the blue LED 313 and the red LED 316, which allows the light source device 30 having a plurality of colors of light to be provided. This light source device 30 is favorable when used in an image display device, for example.

Also, since the shape of the light emitting components in the blue LED 313 and the red LED 316 is substantially similar to the emission end face shape of the first rod integrator 308, a light flux and/or fluorescent light flux can be utilized simultaneously at high efficiency.

(12) The light source device 40 further comprises a rod integrator 403 for spatially separating laser light and fluorescent light.

With this technology, since the dichroic filter 403 is used, in the red segment, for example, unnecessary residual laser light that was not converted to a fluorescent light wavelength can be removed. In the green segment, unnecessary residual laser light can be removed, and the unnecessarily long wavelength fluorescent light component can be removed from the fluorescent light released from the green phosphor. In the blue segment, speckle noise can be reduced.

(13) With the light source device 60, the dichroic mirror 607 is disposed between the laser light source 604 and the rod integrator 609.

With this technology, the laser light flux and the fluorescent light flux equalized by the rod integrator 609 can be spatially separated in a simple manner by the dichroic mirror 607. Also, since the spatial intensity distribution of the laser light flux and the spatial intensity distribution of the fluorescent light flux can be equalized simultaneously by the single rod integrator 609, a more compact light source device can be obtained.

(14) With the light source devices 10, 30, 40, and 60, the lateral width of laser light in the phosphor wheels 100, 300, 400, and 600 is smaller than 1 with respect to the lateral width of laser light at the emission end faces of the rod integrators 108, 308, 409, and 609. The lateral width of laser light is set by the relay optical systems (109, 110, 111), (309, 311, 312), (410, 413, 414), and (610, 611, 612).

In general, to utilize fluorescent light at high efficiency in a light source device, the laser light spot diameter on the phosphor must be reduced to a certain size. To this end, it is effective to set the magnification of the relay optical system low.

With this technology, since the lateral magnification of laser light is less than 1, a laser irradiation spot that is smaller than the diameter of the emission end faces of the rod integrators 108, 308, 409, and 609 can be formed on the phosphors 102, 302, 402, and 602.

Instead of reducing the magnification of the relay optical system, the laser light spot diameter on the phosphors 102, 302, 402, and 602 can be reduced by reducing the diameter of the emission end faces of the rod integrators 108, 308, 409, and 609. In this case, however, the following problems occur. For example, (a) it is difficult to produce a small-diameter rod integrator at high precision, and (b) coupling loss of laser light tends to occur when the rod integrator incident end face diameter is reduced. Accordingly, it is preferable to control the laser light spot diameter on the phosphor by means of the magnification of the relay optical system.

(15) With the light source devices 30, 40, and 60, the direction in which the fluorescent light is emitted from the phosphor wheels 300, 400, and 600 is substantially opposite from the direction in which the laser light is incident on the phosphor wheels 300, 400, and 600.

With this technology, the direction in which the fluorescent light flux moves is substantially the opposite of the direction in which the laser light flux moves. That is, the light source devices 30, 40, and 60 are reflective light source devices. In this case, more specifically, in an xyz coordinate system, if a phosphor layer is disposed in a plane in which z=0, and a laser light flux is directed from a space in which z>0, centering on the point at which x=y=0, then a fluorescent light flux will be taken off in a space in which z>0. The optical axis of the laser light flux incident on the phosphor is the −z direction, and the optical axis of the fluorescent light flux outputted from the phosphor is the +z direction. Using a reflective type of configuration such as this allows the fluorescent light emitted by the phosphor to be taken off at a high efficiency.

(16) With the light source devices 10, 30, and 40, the laser light sources 104, 304, and 405 are blue semiconductor laser light sources with an oscillation wavelength of at least 435 nm and no more than 470 nm.

With this technology, using a blue laser as the excitation light source allows green, yellow, and red phosphors to be excited efficiently. This is particularly favorable in the excitation of a cerium-doped garnet structure with excellent temperature quenching characteristics.

(17) With the light source device 60, the laser light source 604 is a violet semiconductor laser light source with an oscillation wavelength of at least 380 nm and no more than 430 nm.

With this technology, using a violet laser as the excitation light source allows green, yellow, and red phosphors to be excited efficiently, and also allows a blue phosphor to be excited.

(18) With the light source devices 10, 30, 40, and 60, the phosphors 102, 302, 402, and 602 emit visible light in blue, green, yellow, or red, with the dominant wavelength being fluorescent light.

With this technology, a phosphor with a wavelength band such as this is preferable as a light source device used for an image display device.

(19) The image display device comprises the above-mentioned light source device 80, the spatial light modulation element 804, the illumination optical systems 801 and 802, and the projecting optical system 805. The spatial light modulation element 804 modulates light outputted from the light source device 80. The illumination optical systems 801 and 802 guide light from the light source device 80 to the spatial light modulation element 804. The projecting optical system 805 projects the image emitted from the spatial light modulation element 804 onto a screen. Consequently, an image display device having the above-mentioned effect can be provided.

Other Embodiments (A) In the above embodiments, as shown in FIG. 4, an example was given in which the light flux reflected by the dichroic mirror 411 was transmitted through the dichroic filter 403 via the reflecting mirror 415 and the focusing lens or the condensing lens 416. Instead of this, as shown in FIG. 10, the fluorescent light reflected by the dichroic mirror 411 may be emitted from the light source device.

Figure 10:
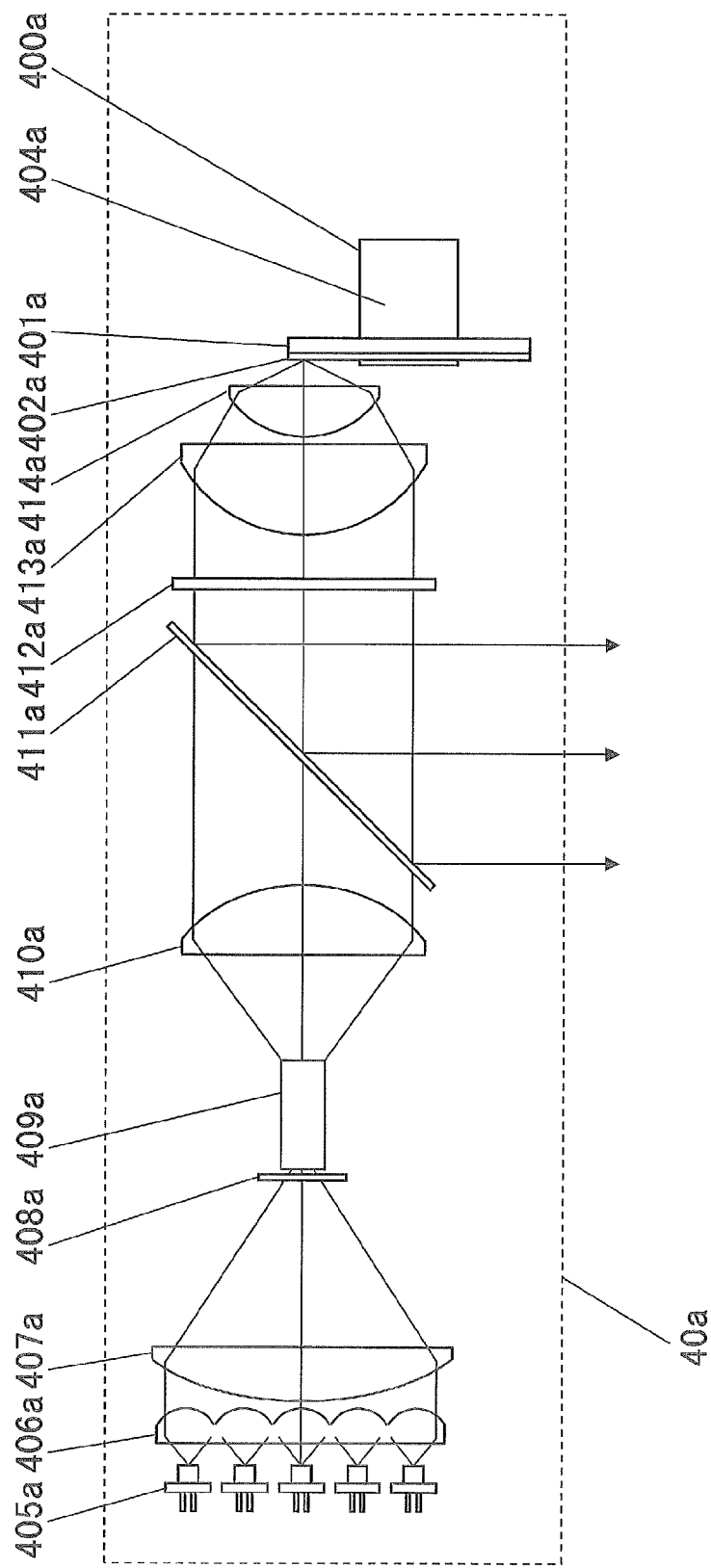
FIG. 10 is a diagram of the configuration of the light source device pertaining to another embodiment.

In FIG. 4, a light source device from which the dichroic mirror 411, the reflecting mirror 415, the focusing lens or the condensing lens 416, the dichroic filter 403, the second rod integrator 417, and the collimating lens 418 have been eliminated becomes the light source device of FIG. 10. This configuration also allows the present technology to be realized. Since the configuration in FIG. 10 is included in the configuration of FIG. 4, it will not be described again here. In FIG. 10, an "a" is appended to the numbers in FIG. 4 for members that are the same as in FIG. 4.

(B) In the above embodiments, example was given of using a dichroic mirror, as an example of a color separator. However, the type of color separator is not limited to what was given in the embodiments. Nor is the angle of the incident light flux with respect to the dichroic mirror limited to what was given in the embodiments. An angle of approximately 45 degrees with respect to the optical axis of the laser light flux and fluorescent light flux can be used as a favorable angle for the incident light flux with respect to the dichroic mirror.

(C) In the above embodiments, an example was given in which the blue LED 313 and the red LED 316 were used as light sources different from the laser light sources 104, 304, 405, and 604. When a light source different from the laser light sources 104, 304, 405, and 604 is used, the type of light source is not limited to what was given in the above embodiments. In the above embodiments an LED, with which it is easy to form a rectangular surface light source, was used as an example of a favorable light source. Also, the emission color of the light source is not limited to what was given in the above embodiments, but favorable examples include red, blue, and green.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the light source device. Accordingly, these terms, as utilized to describe the present technology should be interpreted relative to the light source device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The present technology can be widely utilized in light source devices.

What is claimed is:

1. A light source device, comprising:
a first light source component configured to emit laser light;
a fluorescent component including a phosphor excited by the laser light;
a first illuminance homogenizer disposed between the first light source component and the fluorescent component and configured to convert the laser light to laser light showing a spatially uniform light intensity distribution; and
a relay optical system disposed between the first illuminance homogenizer and the fluorescent component and configured to guide the laser light emitted from the first illuminance homogenizer to the fluorescent component.

2. The light source device according to claim 1, wherein the fluorescent component further includes a reflector, the phosphor is provided to the surface of the reflector, and fluorescent light emitted from the fluorescent component is reflected by the reflector.

3. The light source device according to claim 1, further comprising:
a first color separator configured to separate spatially the laser light from fluorescent light emitted from the fluorescent component.

4. The light source device according to claim 1, wherein the first illuminance homogenizer is constituted by a rod integrator.

5. The light source device according to claim 1, wherein the relay optical system is constituted by at least two lens groups.

6. The light source device according to claim 5, wherein the at least two lens groups include a first lens group and a second lens group, and
the first color separator is disposed between the first lens groups and the second lens group.

7. The light source device according to claim 3, wherein the first color separator is disposed between the first illuminance homogenizer and the fluorescent component.

8. The light source device according to claim 1, further comprising:
a second illuminance homogenizer configured to convert the laser light and fluorescent light emitted from the fluorescent component into laser light and fluorescent light which show a spatially uniform light intensity distribution and output the lights.

9. The light source device according to claim 8, wherein the emission end face shape of the first illuminance homogenizer is substantially equivalent to the incident end face shape of the second illuminance homogenizer.

10. The light source device according to claim 9, wherein if the emission end face area of the first illuminance homogenizer is S1,
the lateral magnification of laser light from the emission end face of the first illuminance homogenizer to the fluorescent component is $\beta1$,
the incident end face area of the second illuminance homogenizer is S2, and
the lateral magnification of fluorescent light from the fluorescent component to the incident end face of the second illuminance homogenizer is $\beta2$,
the relation $$S1 \times (\beta1^2) \times (\beta2^2) \leq S2$$

is satisfied.

11. The light source device according to claim 8, wherein the second illuminance homogenizer is constituted by the same optical elements as the first illuminance homogenizer.

12. The light source device according to claim 8, further comprising:
a second light source component configured to emit light of a different wavelength from that of the fluorescent light emitted from the phosphor, wherein the shape of the light emitting component in the second light source component is substantially equivalent to the emission end face shape of the first illuminance homogenizer.

13. The light source device according to claim 8, further comprising:
a second color separator configured to separate spatially the laser light from the fluorescent light.

14. The light source device according to claim 8, wherein the second illuminance homogenizer is constituted by a rod integrator.

15. The light source device according to claim 3, wherein the first color separator is disposed between the first light source component and the first illuminance homogenizer.

16. The light source device according to claim 1, wherein the lateral width of the laser light at the fluorescent component via the relay optical system, with respect to the lateral width of laser light at the emission end face of the first illuminance homogenizer, is less than 1.

17. The light source device according to claim 1, wherein the forward direction of fluorescent light emitted from the fluorescent component is substantially opposite the forward direction of laser light incident on the fluorescent component.

18. An image display device, comprising:
the light source device according to claim 1;
a spatial light modulation element configured to modulate light outputted from the light source device;
an illumination optical system configured to guide light from the light source device to the spatial light modulation element; and
a projection optical system configured to project an image emitted from the spatial light modulation element onto a screen.

* * * * *